United States Patent
Sundaresan

(10) Patent No.: US 11,962,634 B2
(45) Date of Patent: *Apr. 16, 2024

(54) MULTIMODAL CONTENT RECOGNITION AND CONTEXTUAL ADVERTISING AND CONTENT DELIVERY

(71) Applicant: eBay Inc., San Jose, CA (US)

(72) Inventor: Neelakantan Sundaresan, Mountain View, CA (US)

(73) Assignee: eBay Inc., San Jose, CA (US)

(*) Notice: Subject to any disclaimer, the term of this patent is extended or adjusted under 35 U.S.C. 154(b) by 53 days.

This patent is subject to a terminal disclaimer.

(21) Appl. No.: 17/556,358

(22) Filed: Dec. 20, 2021

(65) Prior Publication Data

US 2022/0116483 A1    Apr. 14, 2022

Related U.S. Application Data

(63) Continuation of application No. 14/588,299, filed on Dec. 31, 2014, now Pat. No. 11,240,349.

(51) Int. Cl.
*H04L 67/01* (2022.01)
*G06F 7/76* (2006.01)
(Continued)

(52) U.S. Cl.
CPC .............. *H04L 67/01* (2022.05); *H04L 65/00* (2013.01); *H04L 65/1089* (2013.01); *H04L 65/612* (2022.05)

(58) Field of Classification Search
CPC ..... H04L 67/01; H04L 65/00; H04L 65/1089; H04L 65/612
(Continued)

(56) References Cited

U.S. PATENT DOCUMENTS 8,774,018 B1    7/2014  Burnette
8,862,151 B2    10/2014 Tran et al.
(Continued)

FOREIGN PATENT DOCUMENTS

CN         102681958 A     9/2012
KR    10-2012-0053829 A    5/2012
(Continued)

OTHER PUBLICATIONS

Advisory Action received for U.S. Appl. No. 14/588,299, dated Aug. 30, 2017, 4 Pages.
(Continued)

*Primary Examiner* — Zi Ye
*Assistant Examiner* — Berhanu Shitayewoldetadik
(74) *Attorney, Agent, or Firm* — Shook, Hardy & Bacon L.L.P.

(57) ABSTRACT

The present disclosure is directed to providing supplemental content to one or more client devices requesting multimedia content. The supplemental content may be determined or selected based on the availability of one or more device channels, such as a display, speakers, or other component of the one or more client devices capable of providing an output. The supplemental content may also be selected based on one or more characteristics of the requested multimedia content, such as a genre, subject matter, or duration. Furthermore, the supplemental content may be determined or selected based on the portions of the requested multimedia content that are the most prominent or significant, such as any audio content, any video content, and/or any textual content. The supplemental content may be provided to the one or more client devices such that it is displayed before, during, or after the display of the requested multimedia content.

20 Claims, 8 Drawing Sheets

(51) Int. Cl.
*G06F 15/16* (2006.01)
*H04L 15/16* (2006.01)
*H04L 65/00* (2022.01)
*H04L 65/1089* (2022.01)
*H04L 65/612* (2022.01)

(58) Field of Classification Search
USPC .......................................................... 709/224
See application file for complete search history.

(56) References Cited

U.S. PATENT DOCUMENTS

| | | | |
|---|---|---|---|
| 8,869,207 B1 | 10/2014 | Earle | |
| 8,964,947 B1 | 2/2015 | Noolu et al. | |
| 9,009,259 B2 | 4/2015 | Lwaniszy | |
| 9,367,627 B1 | 6/2016 | Bantl et al. | |
| 9,424,107 B1 | 8/2016 | Ward et al. | |
| 9,471,203 B1* | 10/2016 | O'Dell, III | G06F 16/4393 |
| 9,575,615 B1 | 2/2017 | Nicholls et al. | |
| 10,601,671 B1* | 3/2020 | Oren | H04L 41/12 |
| 10,762,540 B1 | 9/2020 | Price et al. | |
| 11,240,349 B2 | 2/2022 | Sundaresan | |
| 2002/0078441 A1 | 6/2002 | Drake et al. | |
| 2002/0170062 A1 | 11/2002 | Chen et al. | |
| 2003/0083977 A1* | 5/2003 | Syed | G06Q 30/02 |
| | | | 705/37 |
| 2003/0217061 A1 | 11/2003 | Agassi et al. | |
| 2004/0017310 A1 | 1/2004 | Vargas-hurlston et al. | |
| 2004/0107049 A1 | 6/2004 | White | |
| 2005/0069225 A1 | 3/2005 | Schneider et al. | |
| 2006/0100977 A1* | 5/2006 | Hsu | G06F 16/40 |
| 2006/0150220 A1* | 7/2006 | Martin | H04N 7/18 |
| | | | 725/81 |
| 2007/0043616 A1 | 2/2007 | Kutaragi et al. | |
| 2007/0234213 A1* | 10/2007 | Krikorian | H04L 65/1101 |
| | | | 375/E7.024 |
| 2007/0245028 A1 | 10/2007 | Baxter et al. | |
| 2007/0248055 A1 | 10/2007 | Jain et al. | |
| 2007/0249316 A1 | 10/2007 | Rao | |
| 2007/0250901 A1* | 10/2007 | McIntire | G11B 27/34 |
| | | | 348/E7.071 |
| 2008/0033646 A1 | 2/2008 | Morgan et al. | |
| 2008/0126475 A1 | 5/2008 | Morris | |
| 2008/0133715 A1 | 6/2008 | Yoneda et al. | |
| 2008/0177822 A1 | 7/2008 | Yoneda | |
| 2008/0222316 A1 | 9/2008 | Sato | |
| 2009/0024736 A1 | 1/2009 | Langille et al. | |
| 2009/0171760 A1 | 7/2009 | Aarnio et al. | |
| 2009/0231186 A1 | 9/2009 | Barak et al. | |
| 2009/0249426 A1* | 10/2009 | Aoki | H04N 21/4722 |
| | | | 725/105 |
| 2009/0288132 A1* | 11/2009 | Hegde | H04N 21/4316 |
| | | | 725/141 |
| 2010/0034219 A1 | 2/2010 | Stadelmeier et al. | |
| 2010/0064025 A1* | 3/2010 | Nelimarkka | H04N 21/6581 |
| | | | 715/202 |
| 2010/0075704 A1 | 3/2010 | Mchenry et al. | |
| 2010/0250655 A1 | 9/2010 | Xu et al. | |
| 2010/0272009 A1 | 10/2010 | Cheng et al. | |
| 2010/0306402 A1* | 12/2010 | Russell | H04L 65/1089 |
| | | | 709/230 |
| 2011/0041154 A1* | 2/2011 | Olson | H04H 60/58 |
| | | | 725/54 |
| 2011/0051646 A1* | 3/2011 | Rice | H04L 65/611 |
| | | | 370/312 |
| 2011/0060841 A1 | 3/2011 | Bang et al. | |
| 2011/0119726 A1* | 5/2011 | DeLorme | H04N 21/439 |
| | | | 707/E17.107 |
| 2011/0145869 A1 | 6/2011 | DeLorme | 725/116 |
| 2011/0159890 A1 | 6/2011 | Fortescue et al. | |
| 2011/0197237 A1 | 8/2011 | Turner | |
| 2011/0246495 A1* | 10/2011 | Mallinson | H04N 21/4788 |
| | | | 709/204 |
| 2011/0289121 A1* | 11/2011 | Pirkner | G06F 16/951 |
| | | | 707/805 |
| 2011/0292897 A1 | 12/2011 | Wu et al. | |
| 2011/0307571 A1 | 12/2011 | Bakke | |
| 2012/0028567 A1 | 2/2012 | Marko | |
| 2012/0053829 A1* | 3/2012 | Agarwal | G06F 16/248 |
| | | | 707/758 |
| 2012/0054811 A1 | 3/2012 | Spears | |
| 2012/0136529 A1 | 5/2012 | Curtis et al. | |
| 2012/0142352 A1 | 6/2012 | Zhang et al. | |
| 2012/0207049 A1 | 8/2012 | Du et al. | |
| 2012/0254457 A1 | 10/2012 | Condon et al. | |
| 2012/0290663 A1* | 11/2012 | Hsieh | G06F 9/4856 |
| | | | 709/217 |
| 2012/0291073 A1 | 11/2012 | Friedman | |
| 2012/0331106 A1 | 12/2012 | Ramamurthy et al. | |
| 2013/0059601 A1 | 3/2013 | Tran et al. | |
| 2013/0111520 A1 | 5/2013 | Lo et al. | |
| 2013/0141555 A1 | 6/2013 | Ganick et al. | |
| 2013/0155976 A1 | 6/2013 | Chen et al. | |
| 2013/0198642 A1 | 8/2013 | Carney | |
| 2013/0215820 A1 | 8/2013 | Redana et al. | |
| 2013/0232233 A1 | 9/2013 | Reza | |
| 2013/0254675 A1 | 9/2013 | De Andrade et al. | |
| 2013/0262997 A1* | 10/2013 | Markworth | H04N 21/4828 |
| | | | 715/716 |
| 2013/0290493 A1 | 10/2013 | Oyman et al. | |
| 2013/0315107 A1 | 11/2013 | Lindner et al. | |
| 2014/0044036 A1 | 2/2014 | Kim et al. | |
| 2014/0064471 A1 | 3/2014 | Krishnan et al. | |
| 2014/0068789 A1 | 3/2014 | Watts et al. | |
| 2014/0112506 A1 | 4/2014 | Hopkins | |
| 2014/0136596 A1* | 5/2014 | Watfa | H04N 21/440236 |
| | | | 709/203 |
| 2014/0157296 A1* | 6/2014 | Amidei | H04N 21/4788 |
| | | | 725/13 |
| 2014/0196085 A1* | 7/2014 | Dunker | H04N 21/812 |
| | | | 725/36 |
| 2014/0270700 A1* | 9/2014 | Dhanasarnsombat | G11B 27/28 |
| | | | 386/241 |
| 2014/0297745 A1* | 10/2014 | Tarbox | H04L 65/4053 |
| | | | 709/204 |
| 2014/0329535 A1 | 11/2014 | Sadiq et al. | |
| 2014/0331264 A1* | 11/2014 | Schneiderman | G06F 16/748 |
| | | | 725/92 |
| 2014/0335823 A1 | 11/2014 | Heredia et al. | |
| 2014/0337884 A1 | 11/2014 | Tran et al. | |
| 2014/0351870 A1 | 11/2014 | Amine et al. | |
| 2014/0358950 A1 | 12/2014 | Maselli | |
| 2014/0372210 A1* | 12/2014 | Watfa | G06Q 30/0251 |
| | | | 705/14.49 |
| 2015/0016281 A1 | 1/2015 | Jagetiya et al. | |
| 2015/0029866 A1 | 1/2015 | Liao et al. | |
| 2015/0029886 A1 | 1/2015 | Seo et al. | |
| 2015/0046953 A1 | 2/2015 | Davidson et al. | |
| 2015/0066510 A1* | 3/2015 | Bohrer | H04L 65/764 |
| | | | 704/260 |
| 2015/0074243 A1 | 3/2015 | Russell et al. | |
| 2015/0074413 A1 | 3/2015 | Hao et al. | |
| 2015/0089023 A1 | 3/2015 | Phillips | |
| 2015/0106502 A1* | 4/2015 | Shakhmetov | H04W 72/56 |
| | | | 709/224 |
| 2015/0124641 A1 | 5/2015 | Macdonald et al. | |
| 2015/0139048 A1 | 5/2015 | Lou | |
| 2016/0112740 A1 | 4/2016 | Francisco et al. | |
| 2016/0171062 A1 | 6/2016 | Bufe et al. | |
| 2016/0191356 A1 | 6/2016 | Sundaresan | |
| 2016/0313868 A1 | 10/2016 | Weng et al. | |
| 2016/0342574 A1 | 11/2016 | Zhang et al. | |
| 2017/0142653 A1 | 5/2017 | Qi et al. | |
| 2017/0227965 A1 | 8/2017 | Decenzo et al. | |
| 2017/0331914 A1 | 11/2017 | Loach | |

(56) References Cited

U.S. PATENT DOCUMENTS

2018/0041605 A1 2/2018 Zhang et al.
2018/0165693 A1* 6/2018 Jain .................... G06F 9/45558

FOREIGN PATENT DOCUMENTS

WO 94/24107 A1 10/1994
WO 2012/083177 A1 6/2012

OTHER PUBLICATIONS

Final Office Action received for U.S. Appl. No. 14/588,299, dated Apr. 5, 2017, 21 Pages.
Non Final Office Action Received for U.S. Appl. No. 14/588,299, dated Nov. 17, 2016, 14 Pages.
Advisory Action received for U.S. Appl. No. 14/588,299, dated Oct. 31, 2018, 3 pages.
Final Office Action received for U.S. Appl. No. 14/588,299, dated Aug. 8, 2018, 38 pages.
Final Office Action Received for U.S. Appl. No. 14/588,299, dated Dec. 4, 2019, 18 pages.
Final Office Action Received for U.S. Appl. No. 14/588,299 , dated Oct. 6, 2020, 25 pages.
Non Final Office Action Received for U.S. Appl. No. 14/588,299, dated May 24, 2021, 19 Pages.
Non Final Office Action Received for U.S. Appl. No. 14/588,299, dated May 27, 2020, 20 pages.
Non-Final Office Action received for U.S. Appl. No. 14/588,299, dated Dec. 28, 2017, 22 Pages.
Non-Final Office Action received for U.S. Appl. No. 14/588,299, dated May 28, 2019, 14 pages.
Notice of Allowance received for U.S. Appl. No. 14/588,299, dated Sep. 22, 2021, 14 pages.

* cited by examiner

MULTIMODAL CONTENT RECOGNITION AND CONTEXTUAL ADVERTISING AND CONTENT DELIVERY

CROSS REFERENCE TO RELATED APPLICATIONS

This application is a continuation of U.S. patent application Ser. No. 14/588,299 by Sundaresan, entitled "Multimodal Content Recognition and Contextual Advertising and Content Delivery," filed Dec. 31, 2014, which is incorporated herein by reference in its entirety.

TECHNICAL FIELD

The present application relates generally to the technical field of data processing and the interactive presentation of data.

BACKGROUND

A user may desire to receive multimedia content on a mobile device. However, the user may be using the mobile device in such a way that various components (e.g., channels) of the mobile device are unavailable, such as its display, audio output (e.g., speakers), or other such channels. Where the multimedia content contains content in various formats (e.g., video, audio, textual, etc.) for consumption in different channels of the mobile device, the user may not be able to experience the delivered multimedia content when one of the channels of the mobile device is unavailable.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
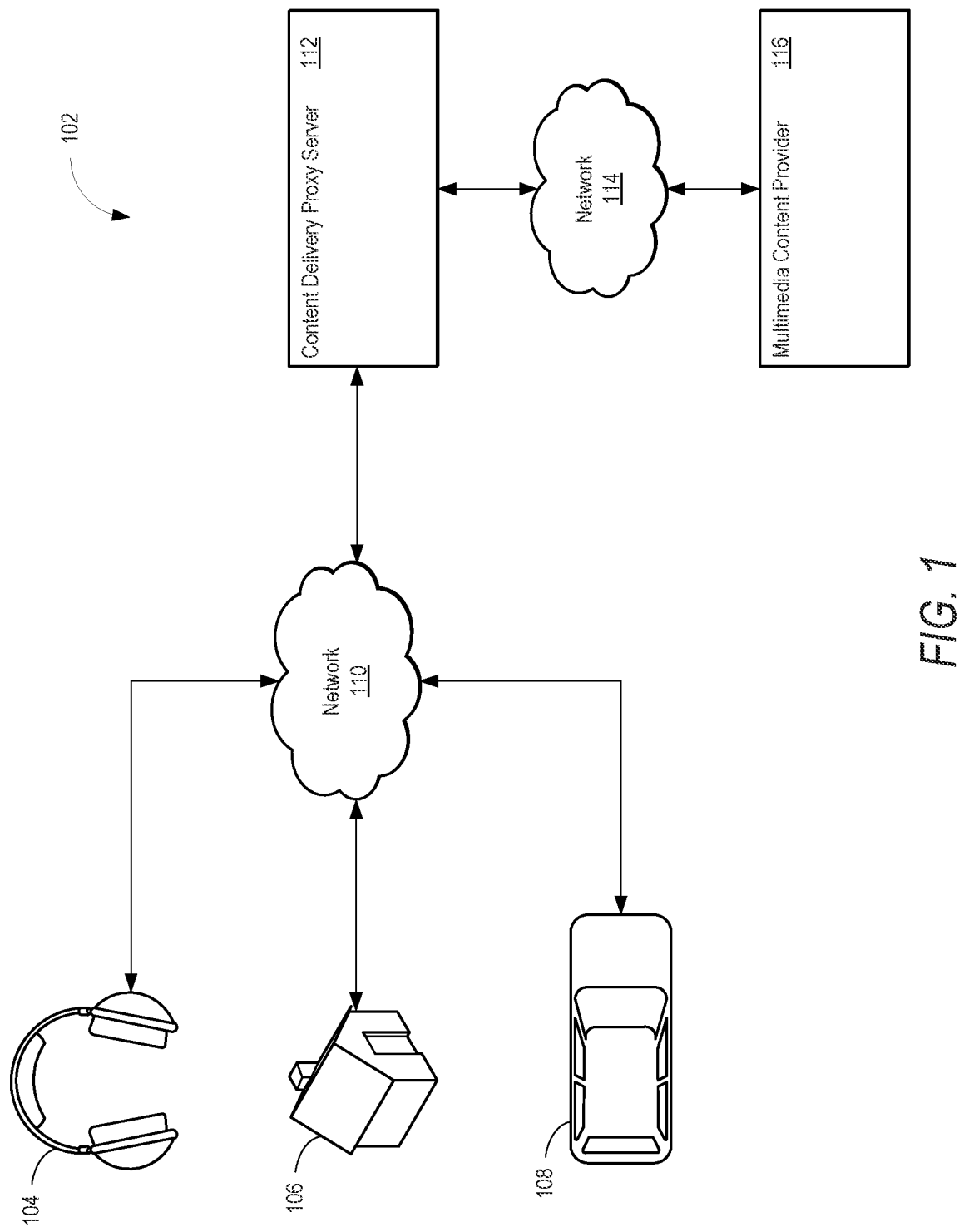
FIG. 1 illustrates an architecture diagram of various client devices in communication with a multimedia content provider via a content delivery proxy server, according to an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure provides a network architecture and content delivery platform for providing multimedia content to a client device. In one embodiment, the disclosed network architecture and content delivery platform provides requested multimedia content to a user that requested the multimedia content via a client device (e.g., mobile device, laptop, etc.). However, one or more channels of the client device may be unavailable, such as the display when the user is operating an automobile or the speakers when the user is in a location designated as a quiet area (e.g., a library, waiting room, etc.). By analyzing which components of the client device are in use or disabled, the client device is able to determine which client device channels are available. Thus, the client device can include the available client device channels along with the request for the multimedia content.

The client device may request the multimedia content via a content delivery proxy server. Architecturally, and as discussed below with reference to FIG. 1, the content delivery proxy server may serve as an intermediary between the client device and a multimedia content server such that the content delivery proxy server can provide supplemental content alongside the requested multimedia content.

For example, when the request is received, such as by the content delivery proxy server, the content delivery proxy server may select supplemental content to include with the multimedia content suitable for the available device channels. In providing this supplemental content, the content delivery proxy server analyzes the requested multimedia content to determine the portions of the multimedia content that are most prominent (e.g., any audio, any video, or any text included with the multimedia content). The content delivery proxy server then further refines its selection of the supplemental content based on this analysis by further selecting supplemental content in a format compatible with the most prominent portions. The selected supplemental content is then muxed with (e.g., added to) the multimedia content so that the client device receives a content stream that includes both the requested multimedia content and the supplemental content. The technical benefit to this approach is that the client device receives a content stream having content that is compatible with the available client device channels rather than content intended for an unavailable channel. In this way, the content delivery proxy server provides engaging supplemental content that aligns with both the prominent parts of the requested multimedia content and the available client device channels.

In one embodiment, this disclosure provides for a system that includes a non-transitory, computer-readable medium storing computer-executable instructions and one or more processors in communication with the non-transitory, computer-readable memory that, having executed the computer-executable instructions, are configured to receive a request for multimedia content, receive availability information for at least one device channel of a client device intended to receive the multimedia content, determine supplemental content based on the requested multimedia content and the availability information, and provide the supplemental content with the multimedia content for output by the client device.

In another embodiment of the system, the supplemental content is determined to be in a format compatible for output by the at least one device channel.

In a further embodiment of the system, the one or more processors are further configured to receive a request to change the at least one device channel and re-determine the supplemental content based on the received request to change the at least one device channel.

In yet another embodiment of the system, the one or more processors are further configured to receive updated device channel availability information and re-determine the supplemental content based on the received updated channel availability information.

In yet a further embodiment of the system, the updated device channel availability information is based on a change in how the client device is being operated.

This disclosure also provides for a methodology for implementing the systems described herein, as well as a non-transitory, computer-readable medium having instructions stored thereon that would cause one or more processors to implement the methods described herein.

The methods or embodiments disclosed herein may be implemented as a computer system having one or more specially-configured modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to execute the instructions.

FIG. 1 is an architecture diagram illustrating a multimedia content delivery platform 102 that includes a various client devices 104-108 in communication with a multimedia content provider 116 via a content delivery proxy server 112, according to an example embodiment. To avoid obscuring the inventive subject matter with unnecessary detail, various functional components (e.g., modules and engines) that are not germane to conveying an understanding of the inventive subject matter have been omitted from FIG. 1. However, a skilled artisan will readily recognize that various additional functional components may be supported by the content delivery platform 102 to facilitate additional functionality that is not specifically described herein.

While the multimedia content delivery platform 102 shown in FIG. 1 employs a client-server architecture, the disclosed subject matter is, of course, not limited to such an architecture, and could equally well find application in other architectures, such as an event-driven, distributed, or peer-to-peer architecture system. Further, the various functional components of the multimedia content delivery platform 102 may be implemented as standalone systems or software programs, which do not necessarily have networking capabilities. Moreover, it shall be appreciated that although the various functional components of the multimedia content delivery platform 102 are discussed in the singular sense, multiple instances of one or more of the various functional components may be employed.

As shown, the multimedia content delivery platform 102 includes client devices 104-108 in communication with a multimedia content provider 116 by way of network 110 and network 114. In FIG. 1, each of the client devices 104-108 are being under a variety of conditions. For example, a first client device 104 is being operated in conjunction with headphones. A second client device 106 is being operated while the user is relatively stationary (e.g., located in his or her home or office). A third client device 108 is being used while the user is moving (e.g., as a passenger in a vehicle). As discussed below, the conditions under which the client devices 104-108 are being used indicate to the content delivery proxy server 112 which client device channels are available for providing content to the user. As used herein, a device channel may refer to any component or structure that provides an output to the user. Examples of device channels include a display, one or more speakers, one or more vibration motors (e.g., a motor that causes the client device to vibrate), and other such device channels.

A content delivery proxy server 112 may serve as an intermediary between the one or more client devices 104-108 and the multimedia content provider 116. In other words, the content delivery proxy server 112 may be communicatively coupled to the client devices 104-108 via a network 110 and communicatively coupled to the multimedia content provider 116 via a network 114. The client devices 104-108, content delivery proxy server 112, and the multimedia content provider 116 may be communicatively coupled using a variety of different mechanisms. For example, in some instances, the client devices 104-108, the content delivery proxy server 112, and the multimedia content provider 116 communicate via the network 110 or network 114 via a Wi-Fi connection (e.g., 802.6a/b/g/n), a Worldwide Interoperability for Microwave Access (WiMAX) connection, Bluetooth®, another type of wireless data connection, or combinations thereof. Accordingly, the networks 110,114 may include one or more wireless access points coupled to a local area network (LAN), a wide area network (WAN), such as the Internet, or other packet-switched or circuit-switched data network. In other instances, the connections to the networks 110, 114 may be a wired connection, for example an Ethernet link, and the networks 110, 114 may be a LAN, a WAN, the Internet, or other packet-switched or circuit-switched data network.

Client devices 104-108 may be any device or combination of devices configured to access the multimedia content provider 116. In this regard, the client devices 104-108 may include any combinations of desktop computers, laptop computers, personal digital assistants (PDAs), smartphones, tablet computers, or any other kind of computing device. Furthermore, in some implementations, the client devices 104-108 themselves may include a combination of devices.

The multimedia content provider 116 is configured to provide requested multimedia content to one or more of the client devices 104-108. For example, the multimedia content provider 116 may be a video service provider that provides various videos to the client devices 104-108. As another example, the multimedia content provider 116 may be a music provider that provides various songs to the client devices 104-108. Further still, the multimedia content provider may provide different types of content to the client devices 104-108, such as videos, songs, electronic documents (e.g., word processing documents, electronic presentations, etc.), and other such types of multimedia content.

The multimedia content provided to the client devices 104-108 may be provided as a content stream, where the content stream includes various types of multimedia content. For example, a content stream may include video, audio, or textual content. A music video is an example of a content stream that includes both audio and video content (e.g., the song may be the audio content and images accompanying the song may be the video content). As another example, a content stream may include the text of a speech (e.g., The Gettysburg Address) distributed across multiple image frames along with the voice of a narrator reading the speech. Thus, in this example, the content stream includes video, audio, and textual content. Different combinations of multimedia content are also possible as a well as content streams having a single type of content (e.g., audio-only content).

The content stream provided to the client devices 104-108 may be provided as buffered stream, a non-buffered stream, or as a downloadable file. As a buffered stream, a client device may receive a predetermined amount of the content stream (e.g., the content stream is buffered) before the client device outputs the received content stream (e.g., via a display, speakers, vibration motor, etc.). As a non-buffered stream, a client device may start the output of the content stream as soon as the content stream is received by the client device (e.g., the client device performs little or no buffering of the content stream). As a downloadable file, the client device may receive the content stream in its entirety, which it may then output when requested by the user.

When one or more of the client devices 104-108 request multimedia content, the request may be received by the content delivery proxy server 112. The content delivery proxy server 112 may then request the multimedia content from the multimedia content provider 116. By serving as an intermediary between the client devices 104-108 and the multimedia content provider 116, the content delivery proxy server 112 can insert or add supplemental content to the requested multimedia content. Providing the supplemental content to the client devices 104-108 can alert a user to other multimedia content which may be of interest or other products and/or services that may be relevant to the user. Examples of supplemental include recommendations of other content related to the requested multimedia content, information about products or services related to the subject matter of the requested multimedia content, advertisements that may be of interest based on the requested multimedia content, and other such supplemental content.

The supplemental content provided to the client devices 104-108 may be in the form of video, audio, text (e.g., a hyperlink), or combinations thereof. In providing the supplemental content, the content delivery proxy server 112 may be configured to determine the prominent or more relevant portions of the requested multimedia content so that it selects supplemental content in a format (e.g., video, audio, text, etc.) as relevant or as prominent as the more prominent features of the requested multimedia content. For example, the content delivery proxy server 112 may analyze the various content types of the requested multimedia content (e.g., any video, audio, or textual content) to determine which of the content types are the more (or most) prominent types. Based on this analysis, the content delivery proxy server 112 may select supplemental content in a similar format.

In addition to selecting supplemental content based on prominent portions of the requested multimedia content, the content delivery proxy server 112 may also select the supplemental content based on the operating conditions of the client devices 104-108. In particular, the content delivery proxy server 112 may select the supplemental content based on the available client device channels for a given device. As discussed below with reference to FIG. 2, the availability of client device channels may be provided by the client device itself or it may be requested by the content delivery proxy server 112.

The availability of client device channels for a given client device may be dependent on how the client device is being used. For example, the client device 108 is being used by the passenger and/or driver of a vehicle. Where the driver of the vehicle is using the client device 108, such as by using the client device 108 as a streaming audio player in conjunction with the multimedia content provider 116, the display of the client device 108 may be unavailable. Thus, the client device 108 may inform the content delivery proxy server 112 that audio and/or tactile output is available or that the display of the client device 108 is unavailable. In this example, the content delivery proxy server 112 may select supplemental content in an audio format such that the supplemental content is playable by the audio output components of the client device 108.

As another example, the client device 106 may be in use by a stationary user, but in an environment where audio output is prohibited (e.g., where children are asleep). In this example, the client device 106 may inform the content delivery proxy server 112 that the audio output of the client device is unavailable or that only the display of the client device is available. In this regard, the content delivery proxy server 112 may select supplemental content in a visual format (e.g., having text, one or more graphics, or other such visual content).

While FIG. 1 illustrates that the content delivery proxy server 112 and the multimedia content provider 116 as separate entities, one of ordinary skill in the art will understand that other arrangements of the content delivery proxy server 112 and the multimedia content provider 116 without departing from the scope of this disclosure. For example, the content delivery proxy server 112 and the multimedia content provider 116 may be implemented on the same set of hardware with the same set of components (e.g., the same one or more processors, the same one or more input components, the same one or more output components, the same non-transitory, computer-readable memory, etc.). Furthermore, the content delivery proxy server 112 and the multimedia content provider 116 may be implemented across multiple servers and/or computers, such as in a distributed computing environment.

Figure 2:
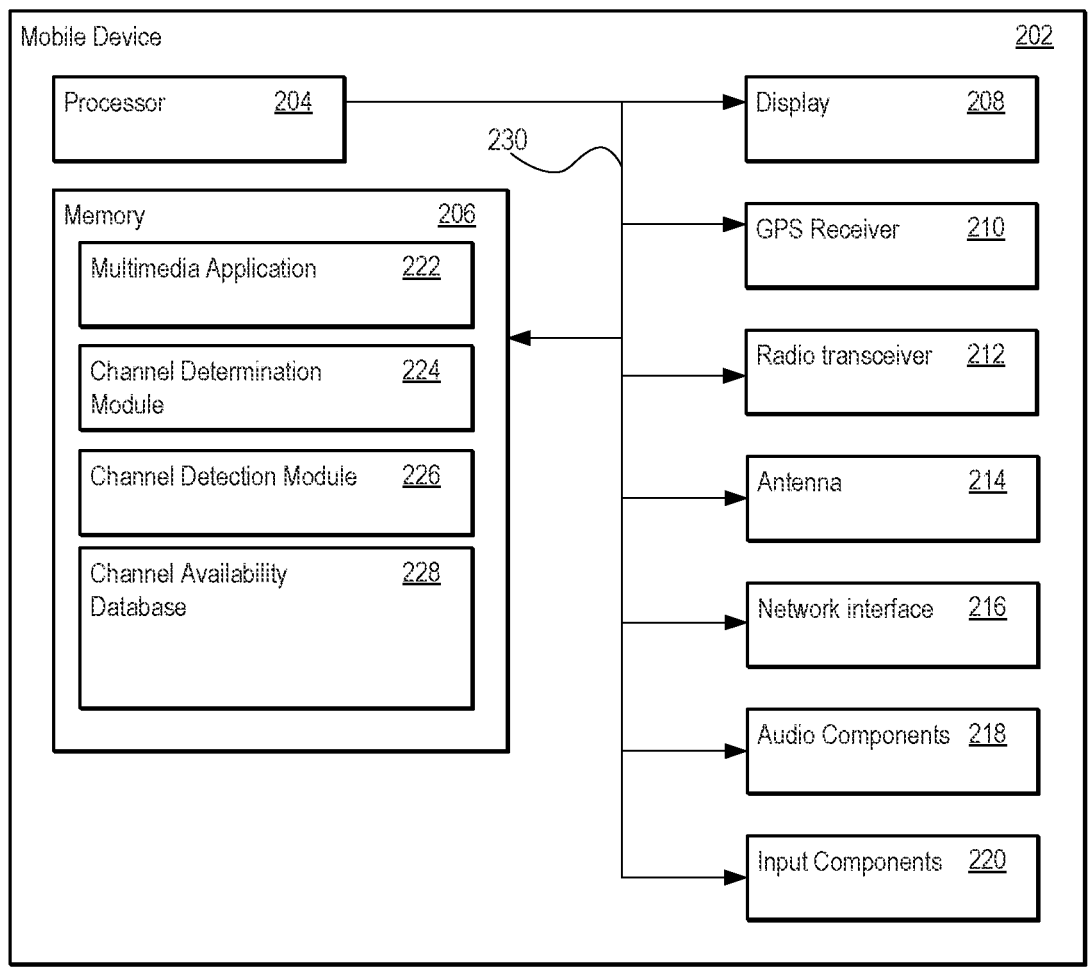
FIG. 2 illustrates a block diagram of a client device in accordance with an example embodiment.

FIG. 2 is a block diagram of a mobile device 202, according to an example embodiment, of the multimedia content delivery platform 102 of FIG. 1. In one embodiment, one or more of the client devices 104-108 are implemented as the mobile device 202.

As illustrated in FIG. 2, the mobile device 202 includes various components found on a mobile device. Examples of these components include one or more processors 204, a memory 206 (e.g., a non-transitory, computer-readable memory), a display 208, a Global Positioning System (GPS) receiver 210, a radio transceiver 212, an antenna 214, one or more wired and/or wireless network interfaces 216, various audio components 218 (e.g., dedicated audio processors, speakers, microphone, etc.), and various input components 220 (e.g., a capacitive or resistive touchscreen, a dedicated keyboard, a wirelessly connected mouse and/or keyboard, etc.). The various components 204-220 may communicate via one or more communication buses 230 such that each component 204-220 may be configured to communicate with any other component 204-220. For example, the GPS receiver 210 and/or radio transceiver 212 may be communicatively coupled to the antenna 214 via the one or more buses 230 so as to provide location-based services for the client device 202. The GPS receiver 210 may be configured to provide GPS information to one or more of the applications residing in the non-transitory, computer-readable memory 206 whereas the radio transceiver 212 may be configured to provide cellular communications (e.g., CDMA, GSM, LTE, etc.) to one or more of the applications of the non-transitory, computer-readable memory 206.

While FIG. 2 illustrates that one or more of the client devices 104-108 may be implemented as the mobile device 202, the client devices 104-108 may be implemented as other types of devices with accompanying hardware and/or software components. For example, one or more of the client devices 104-108 may be implemented as a laptop computer and have such components as one or more processors, a display, one or more wired and/or wireless network interfaces, audio components, and other such components found in a laptop computer. Thus, while the below discussion of the interactions between the client devices 104-108 and the content delivery proxy server 112 refers to one or more of the components 204-220 of the mobile device 202, one of ordinary skill in the art will understand that such interactions may occur where the client devices 104-108 are other types of devices (e.g., desktop computers, laptop computers, tablet computers, etc.).

The various functional components of the mobile device 202 may reside on a single device or may be distributed across several computers in various arrangements. The various components of the mobile device 202 may, furthermore, access one or more databases, and each of the various components of the mobile device 202 may be in communication with one another. Further, while the components of FIG. 2 are discussed in the singular sense, it will be appreciated that in other embodiments multiple instances of the components may be employed.

The one or more processors 202 may be any type of commercially available processor, such as processors available from the Intel Corporation, Advanced Micro Devices, Texas Instruments, or other such processors.

The wired and/or wireless network interface(s) 216 or the radio transceiver 212 may be configured to send to and/or receive data from the content delivery proxy server 112 or the multimedia content provider 116. Examples of network interfaces(s) 216 include an Ethernet interface, an 802.6g/n interface, a Bluetooth® interface, or any combination of wired and wireless interfaces.

The memory 206 may be configured with one or more applications and/or modules 222-226 in determining the device channel availability and requesting the multimedia content from the multimedia content provider 116. The memory 206 may include one or more of a hard drive, flash memory, optical drive, magnetic tape drive, or other such non-transitory, computer-readable media, and may further include combinations of the foregoing (e.g., a combination of hard drives, flash memory, and/or optical drives).

As is understood by skilled artisans in the relevant computer and Internet-related arts, each of the components 222-226 (e.g., a module or engine) may represent a set of executable software instructions and the corresponding hardware (e.g., memory and processor) for executing the instructions. In one embodiment, the components 222-226 include a multimedia application 222, a channel determination module 224, and a channel detection module 226. The components 222-226 may interact with data stored in memory 206, such as a channel availability database 228. The various components 222-226 and data 228 are discussed below.

The multimedia application 222 may be configured to retrieve and output multimedia content requested from the multimedia content provider 116. To that end, the multimedia application 222 may include one or more of a video player, audio player, presentation player, word processing application, or any other application configured to retrieve and output multimedia content. Outputting multimedia content may include displaying the multimedia content on the display 208, playing the multimedia content via one or more of the audio components 218 (e.g., one or more speakers, a pair of headphones, etc.), and/or activating a tactile feedback mechanism (e.g., a vibration motor).

In addition, as the multimedia application 222 may receive the multimedia content in the form of a content stream from the content delivery proxy server 112, the multimedia application 222 may also be configured to output the supplemental content included with the content stream. Outputting the supplemental content may include displaying an overlay on the requested multimedia content with the supplemental content, displaying the supplemental content before, during, or after the display of the multimedia content, or displaying the supplemental content as being incorporated within the requested multimedia content (e.g., the supplemental content is displayed within one or more frames of the requested multimedia content). Furthermore, the manner in which the supplemental content is output or displayed may be configurable. In particular, and as discussed below, the manner in which the supplemental content is output may be based on a determination as to the available device channels for providing the supplemental content.

To determine the available device channels, the memory 206 may be configured with a channel determination module 224, a channel detection module 226, and a channel availability database 228. In one embodiment, the channel detection module 226 detects various operating conditions of the mobile device 202. For example, the channel detection module 226 detects various conditions of the mobile device 202 itself, such as whether the mobile device 202 is stationary or in motion, the orientation of the mobile device 202, whether the mobile device 202 is face or face down, and other such aspects of the mobile device 202 itself. The channel detection module 226 may further detect various operating conditions of one or more of the components 208-220, such as whether the display 208 is active, whether the GPS receiver 210 is active, whether one or more of the audio components 218 are muted, and other such operating conditions of the components 208-220. Further still, the channel detection module 224 whether one or more applications are active or in use by the one or more processors 204, such as a navigation application (not shown), a video game (not shown), an e-mail client (not shown), and other such applications. With regard to application detection, the channel detection module 226 may further detect whether an application has been recently used, such as an application having been placed in a suspended mode pending re-activation by the user. As discussed below, detecting which of the components 208-220 are in use or which applications have been recently used (or are in use) provides guidance as to which of the device channels are most likely to be available or are most likely to capture the attention of the user.

The channel detection module 226 may communicate the various detected operating conditions to the channel determination module 224. The channel determination module 224 may then determine those device channels that are available or likely to be available. In this regard, the channel determination module 224 may communicate with the channel availability database 228 to obtain the probability that a given device channel is available based on a provided operating condition. Accordingly, and in one embodiment, the availability database 228 includes operating conditions of the mobile device 202. The operating conditions may indicate how the mobile device 202 is being used, such as whether the mobile device 202 is in motion, is stationary, whether the display 208 is on or off, whether one or more of the audio components 218 are engaged, and other such operating conditions. The operating conditions may further include whether one or more applications are in use, which applications were recently used, and, in some embodiments, the duration of use for a given application.

Furthermore, each of the operating conditions may be associated with a number of device channels and a probability that a given device channel is available. For example, a stationary operating condition may be associated with an available display device channel, an available audio output device channel, an available tactile feedback device channel, and other such device channels. In this example, when the mobile device 202 is stationary, there is an increased likelihood that several of the device channels are available for displaying or outputting the supplemental content included in the content stream containing the requested multimedia content. As another example, a moving operating condition may be associated with an available audio output device channel. This second example relates to the fact that, while the mobile device 202 is moving, there is a likelihood that the user may not be able to watch the display 208, but may be able to listen to one or more of the audio components 218 (e.g., the speakers of the mobile device 202).

Further still, the channel determination module 224 may query the channel availability database 228 with a variety of operating conditions and obtain device channel availability based on the provided operating conditions. For example, the channel determination module 224 may query the channel availability database 228 with the input that the mobile device 202 is stationary, that a navigation application is in use, and that the display 208 is active or in use. In this example, these inputs indicate that the mobile device 202 is most likely being used as a navigation device; therefore, the user is unlikely to request multimedia content that would occupy the display 208. Given these inputs, the channel determination module 224 may obtain that the audio components 218 are available (or a probability representative of the audio components 218 being available) as a device channel for playing supplemental content. As another example, the channel determination module 224 may query the channel availability database 228 with the input that the mobile device 202 is stationary, that the display 208 is in use, and that one or more of the audio components 218 are muted. In this second example, these inputs indicate that there is a high likelihood that the user is desires to view multimedia content on the display 208, but may be able to listen to audio. In this second example, the channel determination module 224 may obtain a value indicating that display 208 is available (or a probability representative of the display 208 being available) as a device channel for displaying supplemental content along with the requested multimedia content.

As addressed briefly above, the channel availability database 228 may include various values indicating whether a device channel is available based on one or more operating conditions of the mobile device 202. These values may include binary values (e.g., yes or no), probabilistic values, fractional values, or a combination thereof.

Having obtained the device channels that are available (or most likely available), the channel determination module 224 (or any other component 222-226) may send this device channel availability to the content delivery proxy server 112 when the multimedia application 222 sends a request for multimedia content. As discussed above, this request may be acted upon by a content delivery proxy server 112, which is configured to provide supplemental content with the requested multimedia content in a content stream sent to the requesting client device.

In addition detecting available device channels prior to requesting the multimedia content, one or more of the channel determination module 224 and/or the channel detection module 226 may be configured to monitor changes in device channel availability during playback of the requested multimedia content. For example, a user may turn the display 208 off or may mute one or more audio components 218. When a change in the device channel occurs, the channel detection module 226 may re-detect the operating condition of the mobile device 202 to determine which of the device channels are in use or no longer in use, and may communicate these changes to the channel determination module 224. Accordingly, the channel determination module 224 may then re-determine which of the device channels are available for playing or displaying the supplemental content included in the content stream of the requested multimedia content. The channel determination module 224 may then communicate these device channel availability changes to the content delivery proxy server 112, which then may re-select supplemental content to include in the content stream of the requested multimedia content. Thus, the one or more modules 224-226 may be configured to automatically detect changes in device channel availability of the mobile device 202 during the playback of requested multimedia content.

Further still, a user may opt to change the device channel in which the supplemental content and/or the requested multimedia content occurs. In one embodiment, the user manipulates the multimedia application 222 to select a different device channel other than the one selected by the channel determination module 224 and/or the content delivery proxy server 112. For example, where the supplemental content and/or the multimedia content is being displayed on the display 208, the user may select that the multimedia application 222 output the supplemental content and/or multimedia content on one or more of the audio components 218. Such a scenario may occur where a user desires to use the mobile device 202 as a navigation device and would prefer that the display 208 is used for navigation rather than the playback of multimedia content. As another example, the user may enter a location where loud sounds are not permitted (e.g., a hospital, library, etc.), and the user may select that the supplemental content and/or multimedia content be displayed via the display 208 rather than output from the audio components 218. As yet another example, a user may simply prefer that the supplemental content be delivered via a device channel different from the current device channel, such as where the supplemental content is overlaid on the multimedia content being displayed via the display 208 but the user would prefer that the supplemental content be output via one or more of the audio components 218.

As a user makes these changes to the playback of the supplemental content, the multimedia application 222 may report such changes to the content delivery proxy server 112. As discussed below with reference to FIG. 3, the content delivery proxy server 112 may record such changes so that it can determine whether a majority of users prefer to receive a given supplemental content in a preferred format. This type of crowdsourcing technique may influence whether the content delivery proxy server 112 delivers a given supplemental content in a particular format (e.g., an audio format) even though the content delivery proxy server 112 may have determined that the supplemental content could be delivered in a different format (e.g., a video format).

In addition, the content delivery proxy server 112 may monitor and keep track of the device channels preferred by the user of the mobile device 202. In this regard, should the user indicate a preference for one or more device channels over a predetermined device channel preference threshold (e.g., the user has selected a given device channel more than 50% of the time), the content delivery proxy server 112 may default to the device channel preferred by the user when it selects the supplemental content to deliver to the mobile device 202. Effectively, the content delivery proxy server 112 learns of the preferred device channels of users requesting multimedia content such that future selections of supplemental content are in a format deliverable to the preferred device channels.

While the foregoing discussion describes that the mobile device 202 includes a channel availability database 228, variations of the components 222-228 are also possible. For example, the channel detection module 226 may identify and communicate those device channels that are in use to the content delivery proxy server 112 to determine which of those device channels are available for the display or output of supplemental content. As another example, the channel detection module 226 may detect whether any device channels of the mobile device 202 are not in use and report those unused device channels as being available device channels to the content delivery proxy server 112 for the output of supplemental content. Accordingly, one of ordinary skill in the art will understand that, while the foregoing discussion of FIG. 2 describes the use of a channel detection module 226, a channel determination module 224, and a channel availability database 228, alternative or variations of these components 222-228, including where these components 224-228 are implemented or stored, are also contemplated as falling within the scope of this disclosure.

Figure 3:
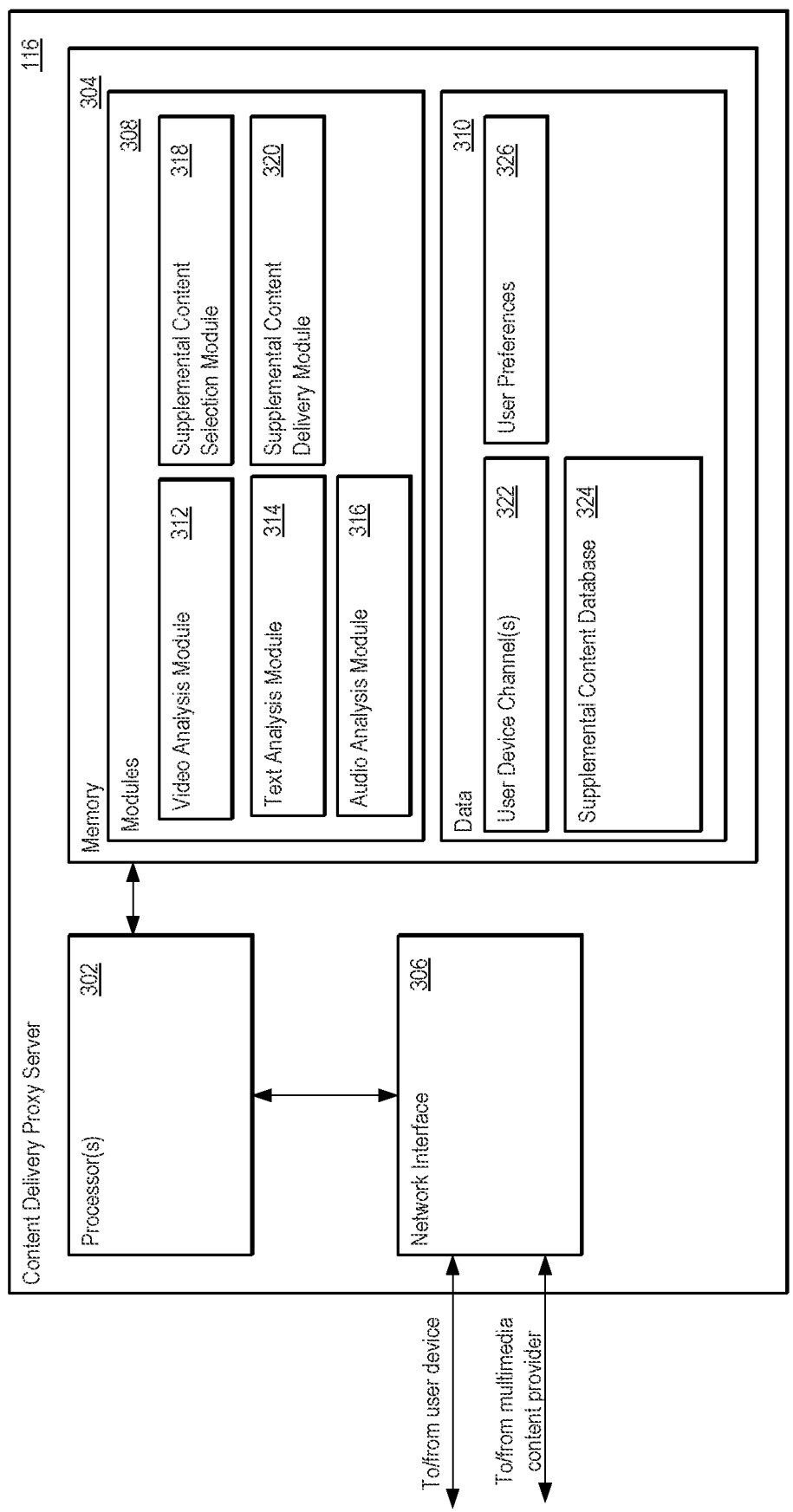
FIG. 3 illustrates a block diagram of the content delivery proxy server in accordance with an example embodiment.

FIG. 3 illustrates a block diagram of the content delivery proxy server 112 in accordance with an example embodiment. In one embodiment, the content delivery proxy server includes one or more processors 302, a memory 304, and a network interface 306. As shown, the various components 302-306 of the content delivery proxy server 112 may be configured to communicate with each other (e.g., via a bus, shared memory, a switch, or application programming interfaces (APIs)). In addition, the various components 302-306 of the content delivery proxy server 112 may reside on a single computer or may be distributed across several computers in various arrangements. The various components 302-306 of the content delivery proxy server 112 may, furthermore, access one or more databases. Further, while some of the components 302-306 of FIG. 3 are discussed in the singular sense, it will be appreciated that in other embodiments multiple instances of the components may be employed.

As understood by one of ordinary skill in the art, modules 308 may represent a set of executable software instructions and the corresponding hardware (e.g., memory and processor) for executing the instructions. To avoid obscuring the subject matter with unnecessary detail, various applications that are not germane to conveying an understanding of the inventive subject matter have been omitted from FIG. 3. However, a skilled artisan will readily recognize that various additional applications, engines, modules, etc., may be used with the content delivery proxy server 112 to facilitate additional functionality that is not specifically described herein.

The content delivery proxy server 112 may be configured to add supplemental content to a content stream containing requested multimedia content. In adding the supplemental content, the content delivery proxy server 112 may determine which portions of the requested multimedia content (e.g., any video, audio, and/or textual components) are prominent or important. To that end, the content delivery proxy server 112 may be configured with modules 308 for analyzing the requested multimedia content. In particular, the modules 308 may include a video analysis module 312, a text analysis module 315, and an audio analysis module 316.

The video analysis module 312 may be configured to analyze a video portion or video stream of the requested multimedia content. In one embodiment, the video analysis module 312 may analyze one or more frames of the video stream to determine whether there are scene changes between video frames or a threshold number of scene changes throughout the video stream. Having scene changes between video frames indicates that the video portion of the multimedia content likely contains a moving video. In one embodiment, the video analysis module 312 may analyze the discrete cosine transform (DCT) DC coefficients and motion vectors of the video stream to detect such scene changes. This is in contrast to a case where the multimedia content may have a video portion where the image does not change (e.g., contains a still image) or insignificantly changes between video frames. This type of scenario may occur where the audio portion of the requested multimedia content is more significant and the video portion of the requested multimedia content is merely there to conform with a given container format (e.g., MP4). Based on the analysis of the video portion of the requested multimedia content, the content delivery proxy server may determine whether the provided supplemental content should include a visual format. Examples of visual formats include text-based formats (e.g., HTML), image-based formats (e.g., GIF, JPG, PNG, etc.), and video-based formats (e.g., MP4, AVI, MPG, etc.). Where the analysis by the video analysis module 312 indicates that the video portion of the requested multimedia content is not significant (e.g., the scene changes relative to the length of the video do not meet or exceed a predetermined scene change threshold), the content delivery proxy server 112 may forego the inclusion of a visual component (e.g., an image, text, video, etc.) of the supplemental content.

In addition to determining whether the requested multimedia content includes scene changes, the content delivery proxy server 112 may also determine whether the requested multimedia content includes textual content, which may be significant or relevant to the requested multimedia content. For example, the multimedia content may include a video portion where image frames of the video portion include the transcription of a speech or other written material (e.g., a book, magazine article, etc.). In this example, the image frames may show portions of the speech or written material and an audio portion may include a song or other musical accompaniment to the written material. Further still, the audio portion may be the speech in a spoken language, such that the video portion and the audio portion are synched.

Accordingly, in one embodiment, where the multimedia content includes a video portion, the text analysis module 314 may perform optical character recognition on one or more image frames of the video portion to determine whether the requested multimedia content includes textual content. The text analysis module 314 may further sample various portions of the requested multimedia content (e.g., a predetermined number or percentage of frames selected from various portions of the requested multimedia content) in the event that the textual content may appear at different times throughout the requested multimedia content. For example, the beginning of the multimedia content may contain no textual content, but later portions of the multimedia content may contain such textual content. Thus, by sampling portions of the multimedia content, the text analysis module 314 can determine whether the requested multimedia content contains textual content that may be relevant to the requested multimedia content.

In addition, and in a further embodiment, the content delivery proxy server 112 includes an audio analysis module 316 to determine whether the requested multimedia content includes a relevant or significant audio portion. To determine whether the requested multimedia content includes a relevant or significant audio portion, the audio analysis module 316 may be configured to perform such operations as audio feature extraction (e.g., one or more mel-frequency cepstral coefficents, temporal features, a spectral centroid, and other such features), feature selection (e.g., by principal component analysis and/or linear discriminant analysis), audio classification (e.g., minimum distance classification, k-nearest neighbor, Gaussian mixture model), and other such operations used in audio processing.

The result of the audio processing performed by the audio analysis module 316 may indicate whether the audio portion of the requested multimedia content is significant or relevant. For example, there may be instances where requested multimedia content includes a video portion and an audio portion, but the audio portion is silent or replaced with static. In this example, the audio analysis module 316 may determine that the audio portion is not relevant or is insignificant. As another example, the requested multimedia content may be a song or speech, which may include a video portion with little to no video, but may have a significant audio portion.

While the foregoing discussion of the various analysis modules 312-316 relates to multimedia content having different types of content, there may be instances where the multimedia content is in a specific format, such as an audio format (e.g., a WAV or MP3 file), a video format (e.g., an MP4 or MPG file), or a textual format (e.g., a DOC or TXT file). In these instances, the content delivery proxy server 112 may invoke the appropriate analysis module dependent upon the format of the requested multimedia content. Thus, while there may be instances where combinations of the modules 312-316 are invoked for a requested multimedia content, there may be instances where only specific ones of the modules 312-316 are invoked.

In analyzing the audio, textual, or video portions of the requested multimedia content, the various modules 312-316 may score the portions of the multimedia content. For example, the video analysis module 312 may score any video portion of the multimedia content, the text analysis module 314 may score any textual or detected textual of the multimedia content, and the audio analysis module 316 may score any audio portion of the multimedia content. The score may include a predetermined range such that a minimum score indicates that the analyzed portion is irrelevant or the most insignificant whereas a maximum score indicates that the analyzed portion is the most relevant or the most significant. The score may be based on the percentage that the analyzed portion encompasses the entirety multimedia content (e.g., a "1" indicating that the analyzed portion encompasses the entirety of the multimedia and a "0.50" indicating that the analyzed portion encompasses approximately half of the multimedia content), the quality of the analyzed portion relative to other analyzed portions (e.g., a "1" indicating that the analyzed portion is of very high quality and a "0" indicating that the analyzed portion is of very poor quality), or other such features of the analyzed portions. As discussed below, the content delivery proxy server 112 may leverage the assigned score in selecting the supplemental content to include in the content stream that is delivered to the client device requesting the multimedia content.

In analyzing and/or scoring the requested multimedia content, the modules 312-316 may analyze and/or score the multimedia content at different times. In one embodiment, the modules 312-316 score and/or analyze the requested multimedia content in real-time or in near real-time (e.g., shortly after the request for the multimedia content is received). This approach has the benefit that the content delivery proxy server 112 need not use resources in analyzing multimedia content that is not requested. In another embodiment, the modules 312-316 may analyze the multimedia content provided by the multimedia content provider 116 before it is requested by one or more of the client devices 104-108. In this embodiment, the modules 312-316 may store one or more scores for the various portions of the multimedia content in a datastore, such as a database (not shown). This approach has the benefit that there may be little delay in providing the multimedia content to the requesting client device as the content delivery proxy server 112 would have already determined the various scores for the portions of the multimedia content before sending it on to the requesting client device. Combinations or variations of the foregoing (e.g., analyzing the multimedia content before it is requested or a short time thereafter) are also contemplated as falling within the scope of this disclosure.

In determining which supplemental content to include in the content stream delivered to the requesting client device, the content delivery server 66, in one embodiment, includes a supplemental content selection module 318. The supplement content selection module 318 may leverage various data 310 to select the supplement content. For example, the supplemental content selection module 318 may leverage the available user device channel(s) 322, the supplemental content database 324, and any user preferences 326 regarding the selection of the supplemental content.

In one embodiment, and with reference to FIG. 2, the user device channel(s) 322 may include the available device channels determined by the channel determination module 224. As discussed previously, the available device channels may include one or more components, such as the display 208, any audio components 218, and any input components 220 (e.g., a vibration motor). Given the available device channel(s) 322, the supplement content selection module 318 may select supplemental content suitable for the available device channel(s) 322. For example, where the available device channel 322 is a display, the supplement content selection module 318 may select supplemental content in a text-based format, an image format, a video format, or a combination thereof (e.g., supplemental content that includes text, an image, and/or a video). As another example, where the available device channel 322 is an audio component (e.g., one or more speaks), the supplement content selection module 318 may select supplemental in an audio-based format. Furthermore, if multiple device channels are available, the supplemental content selection module 318 may select supplemental content playable through one or more of the available device channels (e.g., supplemental content containing both an audio and a video portion).

Additionally, where multiple device channels are available, the supplemental content selection module 318 may reference the scores determined by the analysis modules 312-316 in selecting format appropriate supplemental content. In one embodiment, the format of the portion of the requested multimedia content having the highest score is the type of supplemental content selected for delivery to the client device. For example, where the available device channels include the display 208 and one or more audio components 218, but the portion of the multimedia content having the highest score is the video portion, the supplemental content selection module 318 may select supplemental content in an image-based format for delivery to the requesting client device. Alternatively or in addition, where the scores of the various portions of the requested multimedia content are within a predetermined degree of tolerance (e.g., 0.1, 0.2, etc.), the supplement content selection module 318 may select supplemental content having one or more formats (e.g., having a video, text-based, or audio portion) for those portions that are within the degree of tolerance.

The supplemental content selection module 318 may also select the supplemental content based on the requested multimedia content. In one embodiment, the supplemental content selection module 318 selects supplemental content that is topically related to the requested multimedia content. For example, where the multimedia content relates to automobiles, the selected supplemental content may be an advertisement for an automobile or a notification about other multimedia content related to automobiles. In another embodiment, the supplemental content selection module 318 selects supplemental content that is related to the same genre as the requested multimedia content. For example, where the requested multimedia content is an action movie, the supplemental content selection module 318 may also select supplemental content In selecting the supplemental content, the supplemental selection module 318 may reference a supplemental content database 324. The supplemental content database 324 may include the supplemental content. In other embodiments, the content delivery proxy server 112 may retrieve the supplemental content from another provider (e.g., a supplemental content provider). Alternatively or in addition, the supplemental content database 324 may include associations between supplemental content and various characteristics of the supplemental content, such as available formats of the supplemental content (e.g., a given supplemental content may be deliverable in more than one format), the genre of the supplemental content (e.g., drama, action, suspense, racing, cleaning, etc.), topics related to the supplemental content (e.g., children's toys, politics, cleaning products, space exploration, etc.), the duration of the supplemental content, and other such characteristics.

In this manner, the supplemental content selection module 318 selects supplemental content that is relevant to the requested multimedia content and provided in a device channel that is likely to be viewed by the user. Thus, the content delivery proxy server 112 provides a mechanism of selecting supplemental content that is most likely to be relevant to a user's interest and in a format that is most likely to be consumed (e.g., heard, seen, etc.) by the user.

To deliver the supplemental content to the requesting client device, the content delivery server 66, in one embodiment, includes a supplemental content delivery module 320. The supplemental content delivery module 320 may be configured to package the supplemental content and the requested multimedia content in one or more content streams deliverable to the requesting client device. In one embodiment, the supplemental content is muxed with the requested multimedia content, such that the supplemental content is playable before, during, and/or after the display or output of the requested multimedia content. In another embodiment, the supplemental content may be overlaid the requested multimedia content such that supplemental content appears during the playback of the requested multimedia content.

During the delivery and/or playback of the content stream containing the supplemental content and the multimedia content, the content delivery proxy server 112 may monitor changes in the available device channels. In particular, and as discussed above with regard to FIG. 2, the content delivery proxy server 112 may receive a notification from the client device that one or more available device channels have changed (e.g., an audio device channel or the display is no longer available). Where the change in device channel availability affects the playback of the supplemental content (e.g., the supplemental content was delivered in an image-based format and the display is no longer available), the supplemental content selection module 318 may select the same supplemental content in a different format (e.g., an audio-based format) or different supplemental content in a format suitable for any of the device channels still available (or now available). By monitoring the changes in the device channel availability, the content delivery proxy server 112 can quickly change the provided supplemental content such that the supplemental content is still playable by the requesting client device.

The content delivery proxy server 112 may also monitor one or more user preferences 326 regarding the selected supplemental content. The user preferences 326 may indicate a preferred format in which the supplemental content is to be delivered. For example, the user preferences 326 may indicate that the user of the requesting client device prefers to receive supplemental content in an audio-based format. In this regard, the user preferences 326 may supersede the format of the supplemental content initially selected by the supplemental content selection module 318. Alternatively or in addition, where the user preferences 326 indicate that a given supplemental content should be provided in a specific format, the content delivery proxy server 112 may determine that the given supplemental content is to be provided in the user-preferred format regardless of any determination made by the supplemental content selection module 318.

Figure 4A:
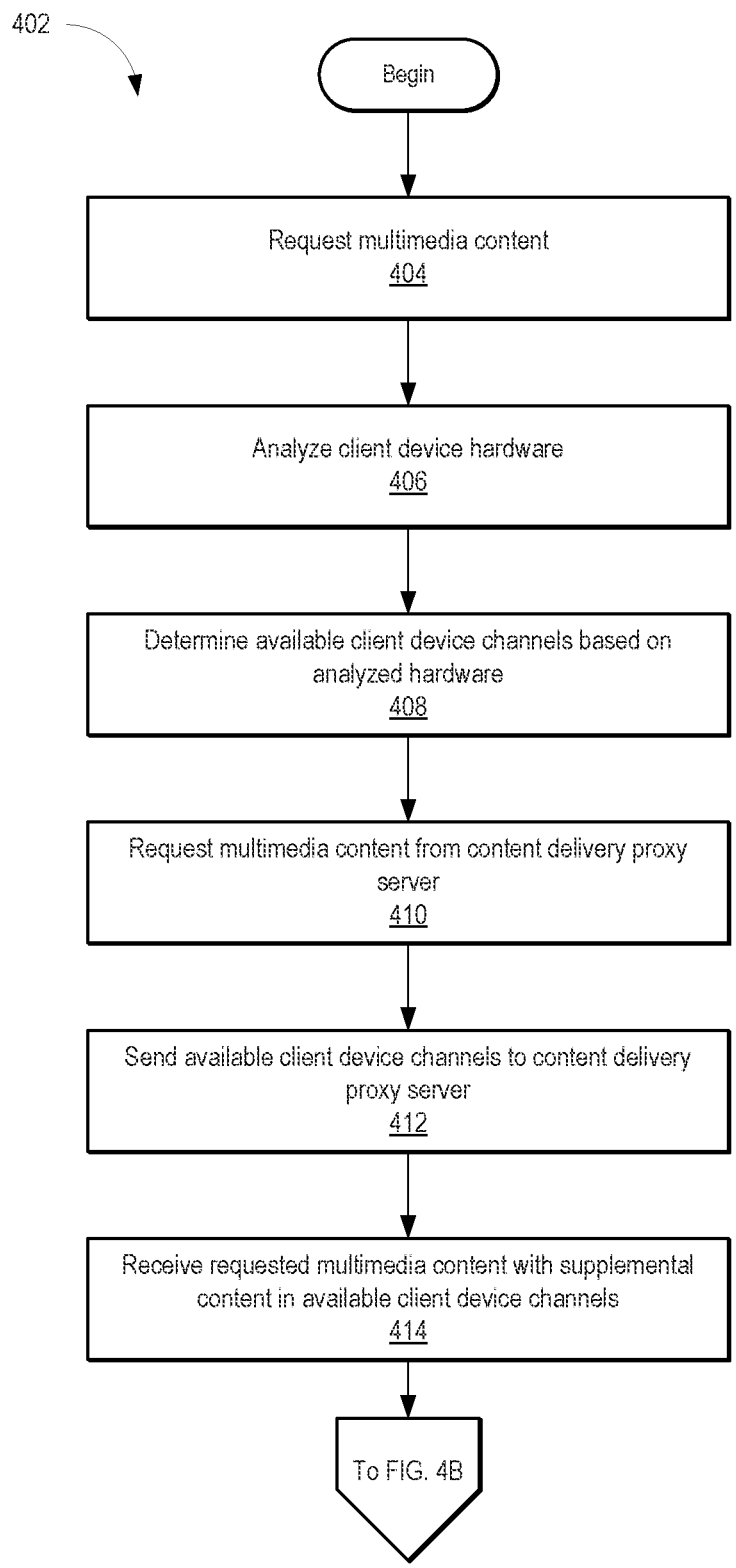
FIGS. 4A-4B illustrate a method, in accordance with an example embodiment, for receiving supplemental content by one or more of the client devices of FIG. 1.
Figure 4B:
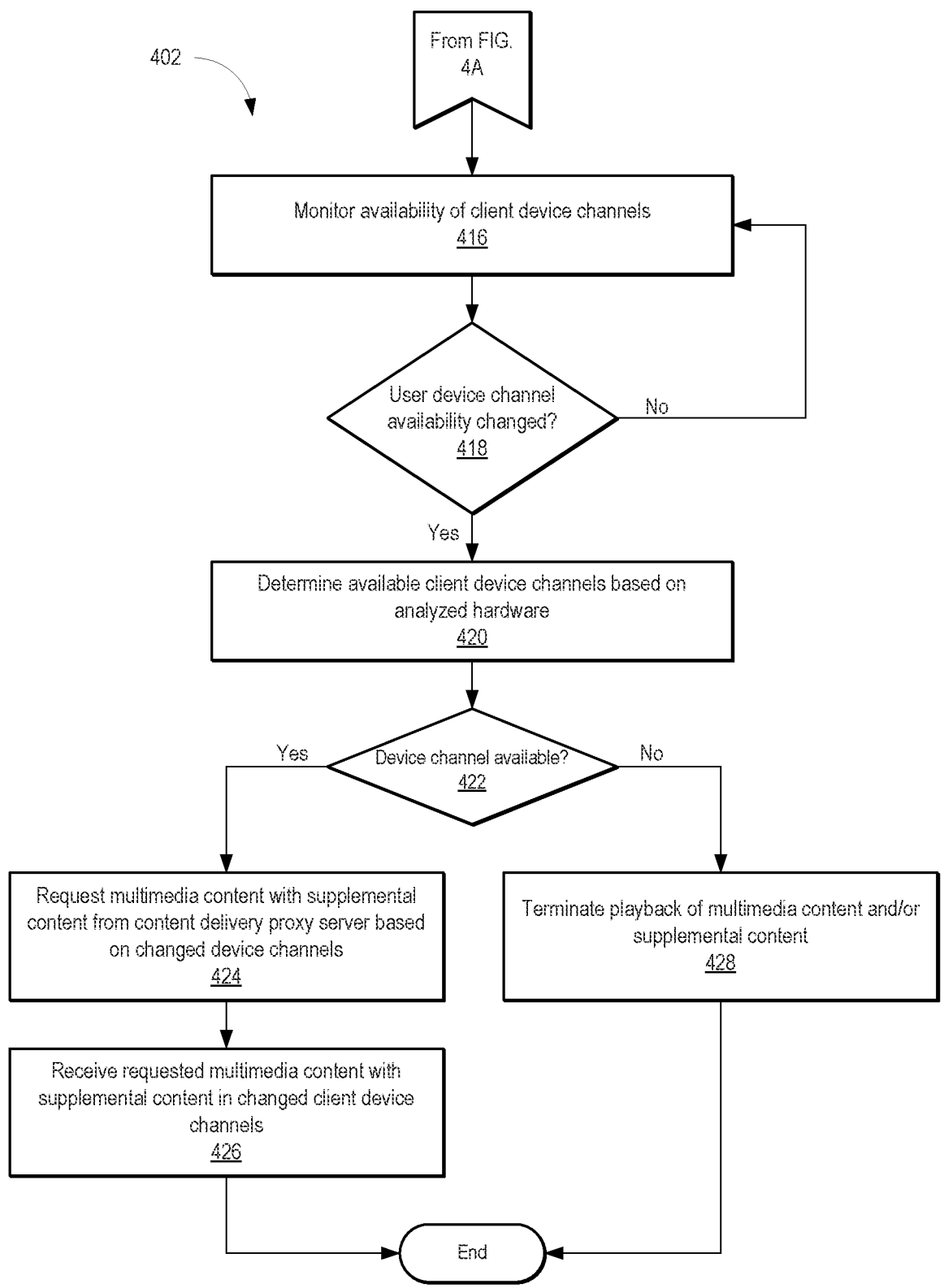

FIGS. 4A-4B illustrate a method 402, in accordance with an example embodiment, for receiving supplemental content by one or more of the client devices 104-108 of FIG. 1. The method 402 may be implemented by one or more of the client devices 104-108 working in conjunction with the content delivery proxy server 112 and, accordingly, is merely described by reference thereto. Initially, and with reference to FIG. 4A, the multimedia application 222 may receive a request for multimedia content (Operation 404). Activating the multimedia application 222 to receive the multimedia content may cause the channel detection module 226 to analyze the client device hardware (Operation 406). In particular, the channel detection module 226 may detect which client device channels are in use and/or how any of the client device channels are being used. Based on this analysis, the channel determination module 224 may then determine whether any of the detected client device channels are available (Operation 408).

The request for the multimedia content and the determined client device channel availability may be communicated to the content delivery proxy server 112 (Operation 410 and Operation 412). After processing this request (discussed with reference to FIGS. 5A-5B, below), the multimedia application 222 may then receive a content stream containing the requested multimedia content and additional supplemental content provided by the content delivery proxy server 112 (Operation 414). In particular, the supplemental content may be delivered in a format suitable for playback in one or more of the available client device channels.

Referring to FIG. 4B, during the playback of the content stream, one or more of the components 222-226 may monitor for changes in the device channel availability (Operation 416). Where the components 222-226 decide that no changes have occurred ("No" branch of Operation 418), the components 222-226 may continuing monitoring the playback of the content stream. However, if a change is detected in the available device channels ("Yes" branch of Operation 418), the components 222-226 may re-determine whether the client device has any different or additional available client device channels (Operation 420). If one or more client device channels are determined to be available ("Yes" branch of Operation 422), which may be different from the initial one or more client device channels, the client device may then send another request for the multimedia content and/or supplemental content (Operation 424). The requesting client device may then receive the re-requested content stream for playback in one or more of the different or additional available client device channels (Operation 426). Should there client device not have any client device channels available ("No" branch of Operation 422), the multimedia application may terminate the playback of the content stream being received, including the requested multimedia content and/or the included supplemental content (Operation 428).

Figure 5A:
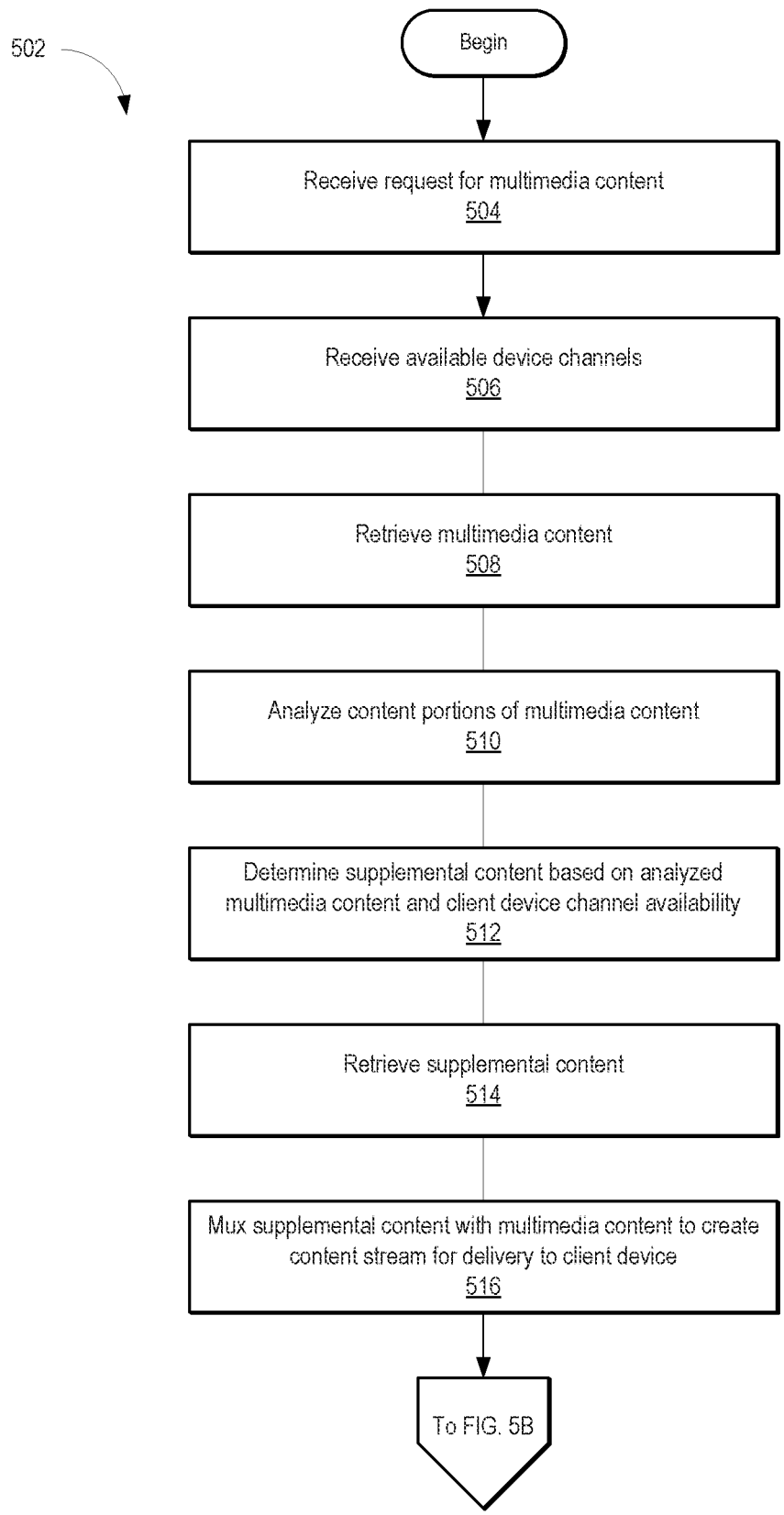
FIGS. 5A-5B illustrate a method, in accordance with an example embodiment, for determining and sending supplemental content by the content delivery proxy server FIG. 1.
Figure 5B:
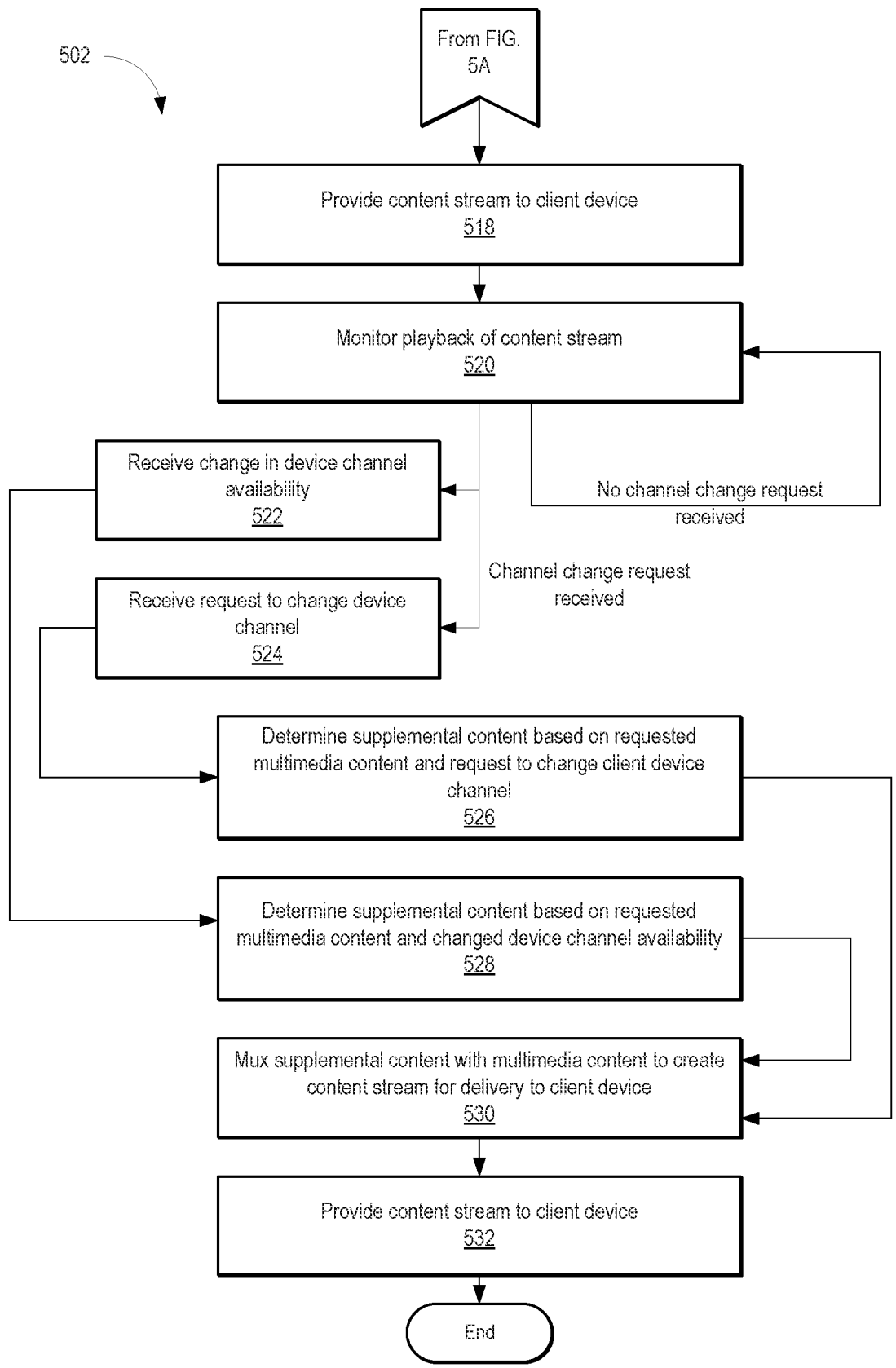

FIGS. 5A-5B illustrates a method 502, in accordance with an example embodiment, for selecting and sending supplemental content by the content delivery proxy server 112. The method 502 may be implemented by the content delivery proxy server 112 and, accordingly, is merely described by reference thereto. Initially, and with reference to FIG. 5A, the content delivery proxy server 112 may receive a request for multimedia content (Operation 504). In addition, the content delivery proxy server 112 may receive information regarding the availability of one or more of the client device channels (Operation 506). Thereafter, the content delivery may request or retrieve the requested multimedia content from the multimedia content provider 116 (Operation 508).

The content delivery proxy server 112 may then analyze various portions of the requested multimedia content, such as an audio portion, video portion, textual portion, and so forth (Operation 510), to determine which portions of the requested multimedia content are the most prominent or most significant. Although FIG. 5A illustrates the analysis of the requested multimedia content occurring shortly after the request for the multimedia content, the content delivery proxy server 112 may analyze the multimedia content at other times, such as prior to receiving the request for the multimedia content.

The content delivery proxy server 112 then determines the supplemental content to include with the requested multimedia content based on the analyzed portions of the multimedia content and the client device channel availability (Operation 512). As discussed previously, the determined supplemental content may be in a format suitable for playback in one or more of the available client device channels or in a format similar to the more prominent or significant portions of the requested multimedia content. The supplemental content selection module 318 may retrieve the determined supplemental content from the supplemental content database 324 (Operation 514), and the supplemental content delivery module 320 may form a content stream that includes the supplemental content and the requested multimedia content for delivery to the requesting client device (Operation 516).

Referring to FIG. 5B, the supplemental content delivery module 320 may then provide the content stream to the requesting client device, such as through network 110 (Operation 518). During the playback of the content stream on the requesting client device, the content delivery proxy server 112 may monitor for changes in the client device channel availability or a request to change the client device channel (Operation 520).

In one example, the content delivery proxy server 112 may receive a notification from the client device that there has been a change in the availability for one or more client device channels (Operation 522). Based on the changes in the client device channel availability, the content delivery proxy server 112 may re-determine or re-select the supplemental content to provide to the requesting client device, including format changes should a previously available client device channel not be available (Operation 528).

In another example, the content delivery proxy server 112 may receive a request from the user via the client device to change the client device channel in which the supplemental content is being output (Operation 524). As discussed previously, the content delivery proxy server 112 may record this request so that the content delivery proxy server 112 provides supplemental content in the requested client device channel. Based on the request to change the client device channel in which the supplemental content is being output, the content delivery proxy server 112 may re-determine or re-select the supplemental content to provide to the requesting client device, including format changes to accommodate the request to change client device channels (Operation 526).

Thereafter, the content delivery proxy server 112 creates a content stream that includes the re-determined or re-selected supplemental content and the requested multimedia content (Operation 530), which it then sends to the client device (Operation 532). Although not shown in FIG. 5B, should the content delivery proxy server 112 be informed that there are no client device channels available, the content delivery proxy server 112 may stop providing portions of the content stream to the requesting client device (e.g., the supplemental content or the requested multimedia content), or the content delivery proxy server 112 may stop providing the content stream altogether.

Figure 6:
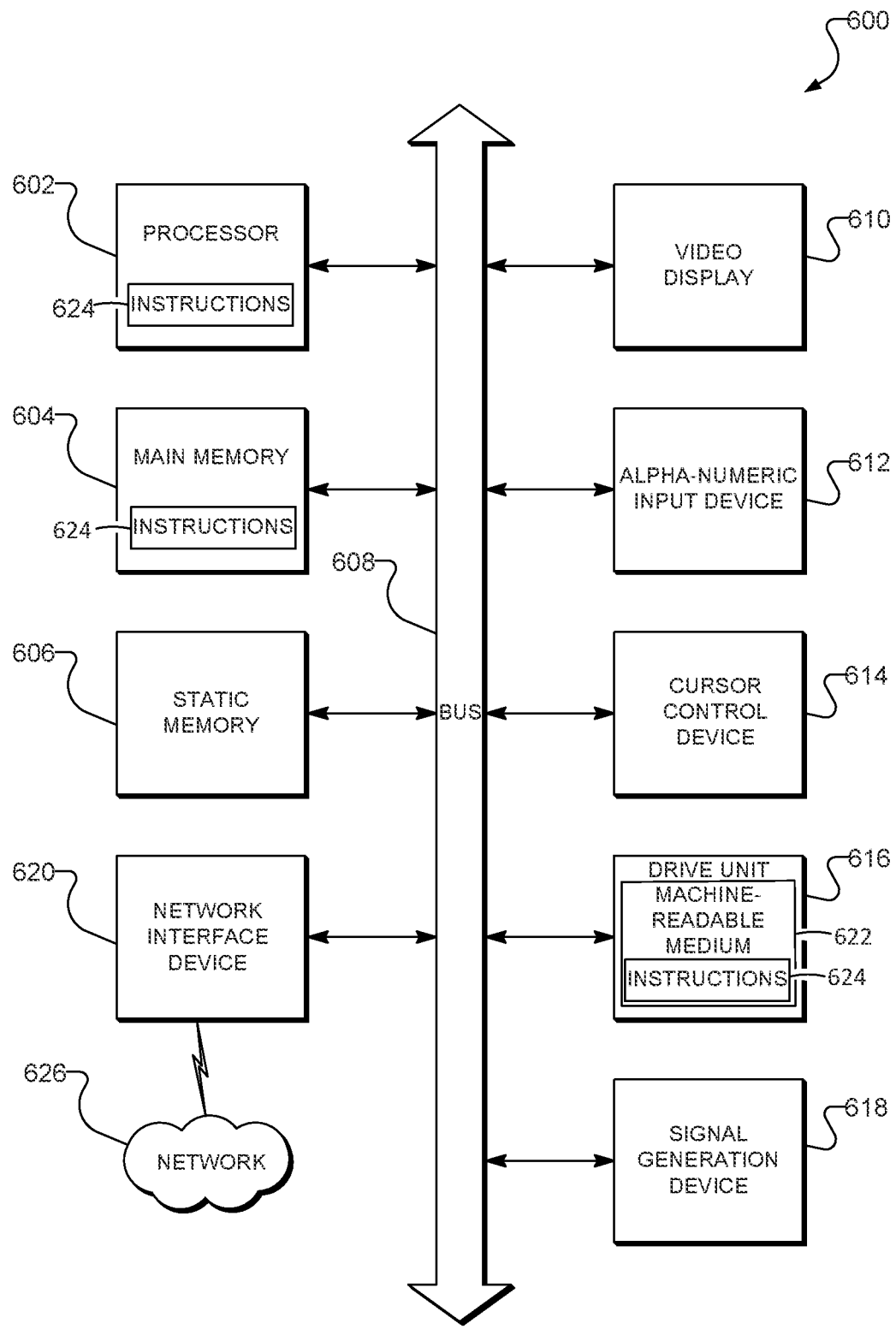
FIG. 6 is a block diagram illustrating components of a machine, according to some example embodiments, able to read instructions from a machine-readable medium and perform any one or more of the methodologies discussed herein, according to aspects of the disclosure.

FIG. 6 is a block diagram illustrating components of a machine, according to some example embodiments, able to read instructions from a machine-readable medium and perform any one or more of the methodologies discussed herein, according to aspects of the disclosure. In particular, FIG. 6 illustrates an example computer system 600 within which instructions 624 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a disk drive unit 616, a signal generation device 618 (e.g., a speaker) and a network interface device 620.

The disk drive unit 616 includes a non-transitory machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting non-transitory, machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

In this manner, the disclosed systems and methods provide a mechanism by which a potential buyer can be assured that he or she is receiving the lowest price for a given good or service. Furthermore, the disclosed systems and methods leverage a number of various technologies including database technologies, real-time communications, authentication protocols, comparative analysis algorithms, and other such networking technologies. Accordingly, the disclosed systems and methods involve a technical approach to address the shortcomings of conducting transactions through an electronic marketplace, particularly where there is some ambiguity as to whether a price for a given good or service is comparable to prices being offered by competitors for the same good or service.

Certain embodiments have been described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled.

A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. The foregoing systems and methods may include hardware (e.g., machine) and software architectures that may be deployed in various example embodiments. It is contemplated that any features of any embodiments disclosed herein can be combined with any other features of any other embodiments disclosed herein. Accordingly, these any such hybrid embodiments are within the scope of the present disclosure.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the

What is claimed is:

1. A method comprising:
receiving, at a server from a client device, a request for a multimedia content stream of multimedia content comprising a plurality of multimedia content types, each multimedia content type corresponding to a different output channel of the client device, wherein output channels of the client device are available for outputting the multimedia content types based at least in part on a geographical position or physical movement of the client device, and the output channels comprise a display and speakers of the client device;
retrieving, by the server, the multimedia content and supplemental content from a content database based at least in part on the request, wherein the supplemental content is retrieved based at least in part on the availability of the output channels of the client device and is associated with a same genre or a same topic as the multimedia content, and transmitting, by the server, the multimedia content and the supplemental content to the client device so that the client device receives a content stream that includes both the requested multimedia content and the supplemental content.

2. The method of claim 1, further comprising: receiving, at the server from the client device, signaling indicating the geographical position or the physical movement of the client device, wherein retrieving the multimedia content and the supplemental content is based at least in part on receiving the signaling.

3. The method of claim 2, further comprising: retrieving a first type of supplemental content from the content database based at least in part on the signaling indicating the client device is geographically stationary or is located in a first geographical position.

4. The method of claim 2, further comprising: retrieving a second type of supplemental content from the content database based at least in part on the signaling indicating the client device is in physical motion or is located in a second geographical position that is different than a first geographical position, wherein the second type of supplemental content is different from a first type of supplemental content.

5. The method of claim 1, further comprising: receiving, at the server from the client device, a notification indicating a change in the availability of the output channels of the client device; retrieving, by the server, second multimedia content and second supplemental content from the content database based at least in part on the notification; and transmitting, by the server, the second multimedia content and the second supplemental content to the client device.

6. The method of claim 5, wherein the notification indicating the change in the availability of the output channels of the client device is received based at least in part on the geographical position of the client device, the physical movement of the client device, or a combination thereof.

7. The method of claim 1, wherein retrieving the multimedia content and the supplemental content further comprises: retrieving the multimedia content and the supplemental content from the content database based at least in part on the multimedia content and the supplemental content being associated with a multimedia content type corresponding to the output channels of the client device that are available for outputting the multimedia content.

8. The method of claim 1, wherein the request further indicates an availability of one or more applications of the client device, the availability of the one or more applications of the client device being based at least in part on whether a respective one of the applications is active, wherein retrieving the multimedia content and the supplemental content from the content database is based at least in part on the availability of the one or more applications of the client device.

9. A system, comprising: a processor; and a memory storing instructions which, when executed by the processor, causes the system to perform operations comprising:
receiving, at a server from a client device, a request for a multimedia content stream of multimedia content comprising a plurality of multimedia content types, each multimedia content type corresponding to, a different output channel of the client device, wherein output channels of the client device are available for outputting the multimedia content types based at least in part on a geographical position or physical movement of the client device, and the output channels comprise a display and speakers of the client device;
retrieving, by the server, the multimedia content and supplemental content from a content database based at least in part on the request, wherein the supplemental content is retrieved based at least in part on the availability of the output channels of the client device and is associated with a same genre or a same topic as the multimedia content, and transmitting, by the server, the multimedia content and the supplemental content to the client device so that the client device receives a content stream that includes both the requested multimedia content and the supplemental content.

10. The system of claim 9, wherein the instructions, when executed by the processor, cause the system to perform operations comprising: receiving, at the server from the client device, signaling indicating the geographical position or the physical movement of the client device, wherein retrieving the multimedia content and the supplemental content is based at least in part on receiving the signaling.

11. The system of claim 10, wherein the instructions, when executed by the processor, cause the system to perform operations comprising: retrieving a first type of supplemental content from the content database based at least in part on the signaling indicating the client device is geographically stationary or is located in a first geographical position.

12. The system of claim 10, wherein the instructions, when executed by the processor, cause the system to perform operations comprising: retrieving a second type of supplemental content from the content database based at least in part on the signaling indicating the client device is in physical motion or is located in a second geographical position that is different than a first geographical position, wherein the second type of supplemental content is different from a first type of supplemental content.

13. The system of claim 9, wherein the instructions, when executed by the processor, cause the system to perform operations comprising: receiving, at the server from the client device, a notification indicating a change in the availability of the output channels of the client device; retrieving, by the server, second multimedia content and second supplemental content from the content database based at least in part on the notification; and transmitting, by the server, the second multimedia content and the second supplemental content to the client device.

14. The system of claim 13, wherein the notification indicating the change in the availability of the output channels of the client device is received based at least in part on the geographical position of the client device, the physical movement of the client device, or a combination thereof.

15. The system of claim 9, wherein retrieving the multimedia content and the supplemental content further comprises: retrieving the multimedia content and the supplemental content from the content database based at least in part on the multimedia content and the supplemental content being associated with a multimedia content type corresponding to the output channels of the client device that are available for outputting the multimedia content.

16. The system of claim 9, wherein the request further indicates an availability of one or more applications of the client device, the availability of the one or more applications of the client device being based at least in part on whether a respective one of the applications is active, wherein retrieving the multimedia content and the supplemental content from the content database is based at least in part on the availability of the one or more applications of the client device.

17. A non-transitory computer-readable medium storing executable instructions which, when executed by a processor of a server, cause the server to perform operations comprising: receiving, at the server from a client device, a request for a multimedia content stream of multimedia content comprising a plurality of multimedia content types, each multimedia content type corresponding to a different output channel of the client device, wherein output channels of the client device are available for outputting the multimedia content types based at least in part on a geographical position or physical movement of the client device, and the output channels comprise a display and speakers of the client device; retrieving, by the server, the multimedia content and supplemental content from a content database based at least in part on the request, wherein the supplemental content is retrieved based at least in part on the availability of the output channels of the client device and is associated with a same genre or a same topic as the multimedia content, and transmitting, by the server, the multimedia content and the supplemental content to the client device so that the client device receives a content stream that includes both the requested multimedia content and the supplemental content.

18. The computer-readable medium of claim 17, wherein the instructions which, when executed by the processor of the server, cause the server to perform operations comprising: receiving, at the server from the client device, signaling indicating the geographical position or the physical movement of the client device, wherein retrieving the multimedia content and the supplemental content is based at least in part on receiving the signaling.

19. The computer-readable medium of claim 18, wherein the instructions which, when executed by the processor of the server, cause the server to perform operations comprising: retrieving a first type of supplemental content from the content database based at least in part on the signaling indicating the client device is geographically stationary or is located in a first geographical position.

20. The computer-readable medium of claim 18, wherein the instructions which, when executed by the processor of the server, cause the server to perform operations comprising: retrieving a second type of supplemental content from the content database based at least in part on the signaling indicating the client device is in physical motion or is located in a second geographical position that is different than a first geographical position, wherein the second type of supplemental content is different from a first type of supplemental content.

* * * * *